(12) United States Patent
Melkonyan et al.

(10) Patent No.: US 11,202,451 B2
(45) Date of Patent: Dec. 21, 2021

(54) CULINARY DEVICE

(71) Applicants: Oganes Melkonyan, Glendale, CA (US); Alan Melkonyan, Glendale, CA (US); Arthur Melkonyan, Tujunga, CA (US)

(72) Inventors: Oganes Melkonyan, Glendale, CA (US); Alan Melkonyan, Glendale, CA (US); Arthur Melkonyan, Tujunga, CA (US)

(*) Notice: Subject to any disclaimer, the term of this patent is extended or adjusted under 35 U.S.C. 154(b) by 96 days.

(21) Appl. No.: 16/413,820

(22) Filed: May 16, 2019

(65) Prior Publication Data

US 2019/0357546 A1 Nov. 28, 2019

Related U.S. Application Data

(60) Provisional application No. 62/676,933, filed on May 26, 2018.

(51) Int. Cl.
*A21C 3/02* (2006.01)
*A21C 11/00* (2006.01)

(52) U.S. Cl.
CPC ............ *A21C 3/021* (2013.01); *A21C 11/008* (2013.01)

(58) Field of Classification Search
CPC ............................... A21C 3/021; A21C 11/008
See application file for complete search history.

(56) References Cited

U.S. PATENT DOCUMENTS

| 132,736 | A | | 11/1872 | Peirce | |
|---|---|---|---|---|---|
| 1,343,844 | A | * | 6/1920 | Rapavy | A21C 5/00 30/307 |
| 2,139,825 | A | * | 12/1938 | Francis | A21C 3/021 492/14 |
| 2,651,398 | A | * | 9/1953 | McGraw | B65G 39/02 193/37 |
| 2,683,428 | A | | 7/1954 | Neal | |
| 2,734,464 | A | | 2/1956 | Hallock et al. | |
| 2,947,130 | A | * | 8/1960 | Evertt | A01D 82/02 56/1 |
| 3,157,135 | A | | 11/1964 | Fetrow et al. | |
| 4,426,200 | A | * | 1/1984 | Muller | A21C 3/021 425/101 |
| 4,832,186 | A | * | 5/1989 | Conrad | B65G 39/16 198/806 |
| 5,213,202 | A | * | 5/1993 | Arnold | A01F 15/18 198/835 |
| 5,412,870 | A | * | 5/1995 | Lehtonen | B29C 41/085 29/895 |
| 5,614,237 | A | * | 3/1997 | Clow | A21C 11/06 425/335 |
| 6,484,341 | B2 | * | 11/2002 | Hefti | A21C 3/021 492/13 |
| 7,182,588 | B2 | * | 2/2007 | Lambauer | A21C 3/04 425/101 |
| 10,227,728 | B2 | * | 3/2019 | Mellander | D21F 1/76 |
| 2002/0116767 | A1 | | 8/2002 | Hefti et al. | |

(Continued)

*Primary Examiner* — Sarang Afzali
(74) *Attorney, Agent, or Firm* — Patent Law Agency, LLC; Peter Ganjian

(57) ABSTRACT

A roller of generally elongated ellipsoid of revolution (also known as prolate spheroid) shape having an outer corrugated surface comprised of rounded, smooth, curved surface ridges and furrows that are transversely oriented along a major axis of the roller.

11 Claims, 23 Drawing Sheets

(56) References Cited

U.S. PATENT DOCUMENTS

2015/0203316 A1* 7/2015 Nitta .................. B41J 11/04
226/190
2016/0200473 A1* 7/2016 Nitta ................. B65C 9/1807
492/27

* cited by examiner

CULINARY DEVICE

CROSS-REFERENCE TO RELATED APPLICATIONS

This Application claims the benefit of priority of co-pending U.S. Utility Provisional Patent Application 62/676,933, filed 26 May 2018 the entire disclosure of which is expressly incorporated, by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to a culinary device and, more particularly, to a roller for rapidly and easily preparing dough and crust even by an inexperienced individual.

Description of Related Art

Conventional rollers are well known and have been in use for a number of years. Most have a flat outer surface that roll out to open dough but in the process, air bubbles are trapped within the flattened dough.

Conventional rollers therefore must generally be rolled and pressed over the already rolled out (or "opened") dough over and over again to remove trapped air. bubbles. However, in doing so, the portions of the dough that is worked by the rollers to remove air bubbles spreads out further and becomes thinner than the remaining other parts of the dough. This generates flattened dough with uneven thickness, which is not desirable.

Accordingly, in light of the current state of the art and the drawbacks to existing rollers and the difficulty to open/work the dough by hand, a need exists for a culinary device that would easily and rapidly roll out dough evenly, remove or displace air bubbles, and create a crust with trapped air bubbles by even the most inexperienced individual.

BRIEF SUMMARY OF THE INVENTION

A non-limiting, exemplary aspect of an embodiment of the present invention provides a culinary device, comprising:

a roller of generally elongated ellipsoid of revolution shape having an outer corrugated surface comprised of rounded, smooth, curved surface ridges and furrows that are transversely oriented along a major axis of the roller.

Another non-limiting, exemplary aspect of an embodiment of the present invention provides a culinary device, comprising:

a roller of generally cylindrical configuration having an outer corrugated surface that includes rounded, smooth, curved surface ridges and furrows that are transversely oriented along a longitudinal axis of the roller.

Still another non-limiting, exemplary aspect of an embodiment of the present invention provides a culinary device, comprising:

a roller of generally prolate spheroid configuration having an outer corrugated surface that includes rounded, smooth, curved surface ridges and furrows that are transversely oriented along a longitudinal axis of the roller.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 3A to 3F are non-limiting, exemplary illustrations of the culinary device illustrated in FIGS. 1A to 2I, detailing various components while progressively illustrating a non-limiting, exemplary method of disassembly thereof in accordance with one or more embodiments of the present invention.

DETAILED DESCRIPTION OF THE INVENTION

Figure 1A:
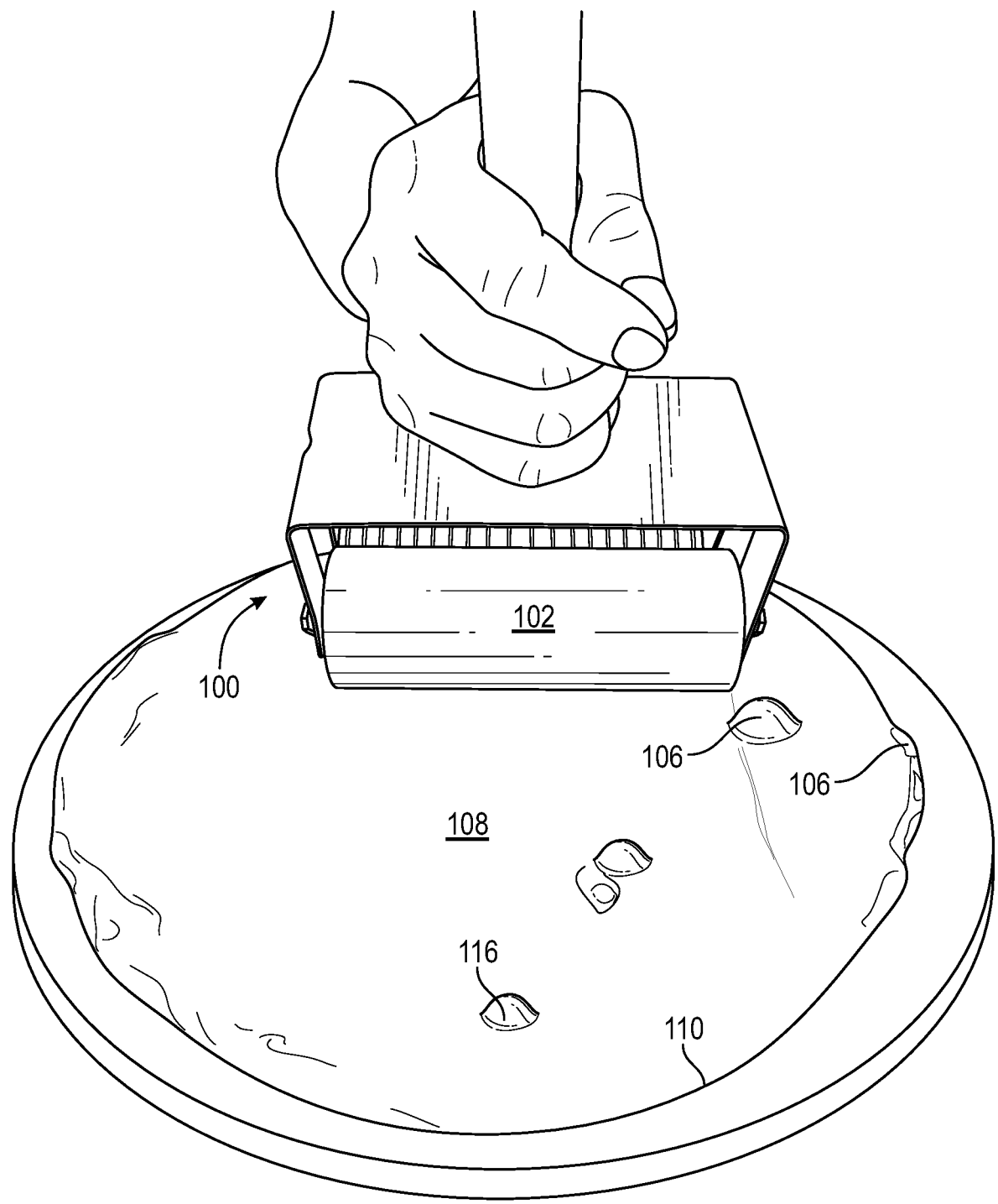
FIGS. 1A to 1J are non-limiting, exemplary illustrations, progressively illustrating a non-limiting, exemplary method of spread-opening a dough in accordance with one or more embodiments of the present invention.

The detailed description set forth below in, connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in, any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied., alone or in various combinations, to one or more of the other embodiments of the invention.

One or more embodiments of the present invention may use the phrase form factor as the physical size and or shape of various members of the one or more embodiments of the culinary device or the present invention, including for example, form factor of a rollers, handle, etc.

One or more embodiments of the present invention provide a culinary device that easily and rapidly roll out dough evenly, remove or displace air bubbles, and create a crust with trapped air bubbles.

FIGS. 1A to 1J are non-limiting, exemplary illustrations, progressively illustrating a non-limiting, exemplary method of spread-opening a dough in accordance, with one or more embodiments of the present invention. As best illustrated in FIGS. 1A to 1J, one or more embodiments of the present invention provide a culinary device 100 that easily and rapidly rolls out dough 108 evenly, removing or displacing air bubbles 106, and creating an edge 110 with trapped air bubbles 106 therein that once cooked or baked will become a lighter and flakier crust.

As further detailed below, culinary device 100 is comprised of dual rollers 102 and 104 (a two-in-one roller device) with a conventional flat, generic cylindrical first roller 102 and a unique and novel second roller 104 (detailed below) in accordance with one or, more embodiments of the present invention.

Figure 1B:
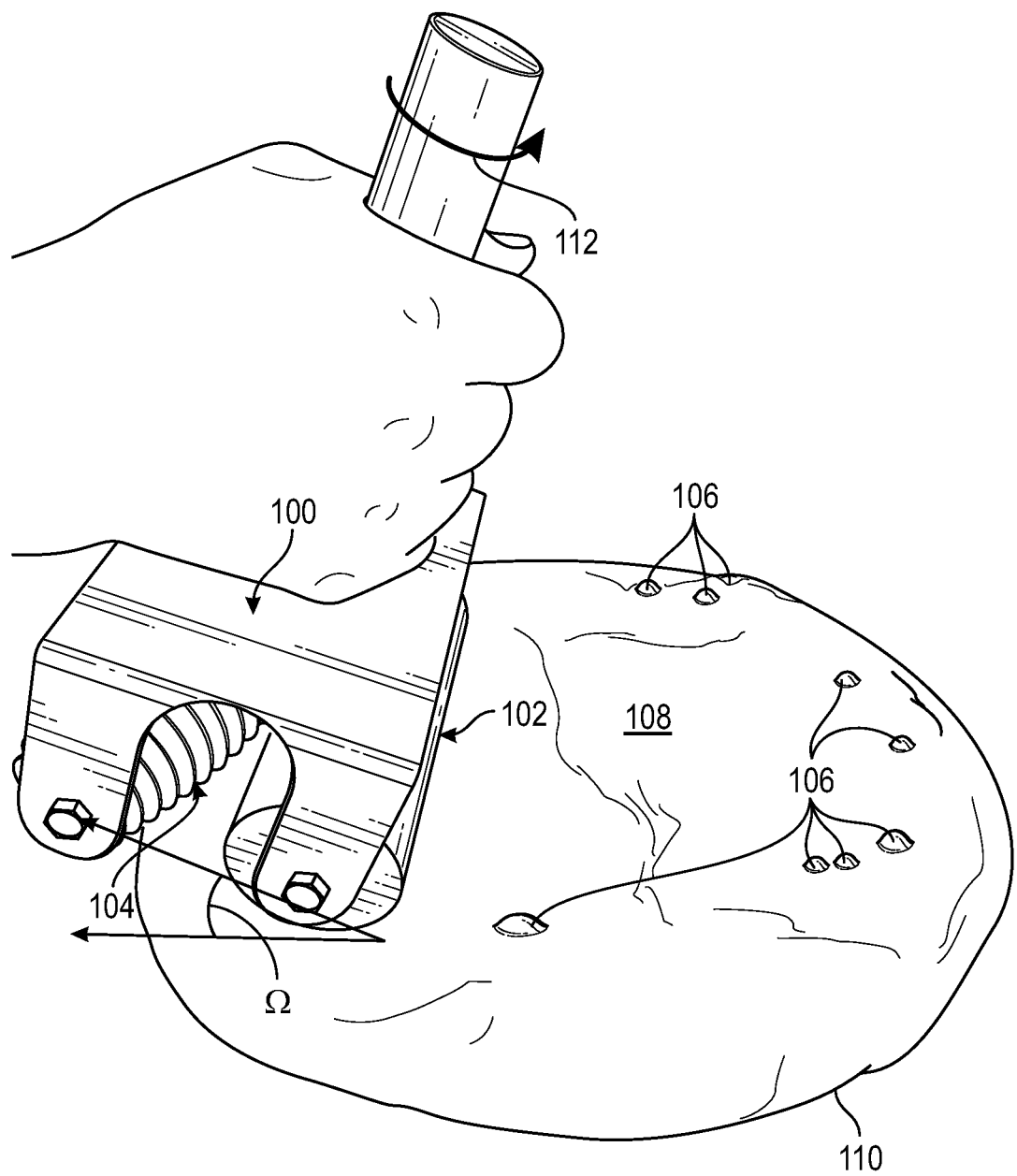

As illustrated in FIGS. 1A and 1B, conventional roller 102 of culinary device 100 may be used in a conventional manner to first roll out or spread-open dough 108, which may trap air bubbles 106 within the rolled out dough 108 in the process. Conventional roller 102 may optionally be used by slightly tilting culinary device 100 at a desired angle Ω (best shown in FIG. 1B) so to raise second roller 104, moving it away from contacting dough 108 while conventional first roller 102 works dough 108.

Figure 1C:
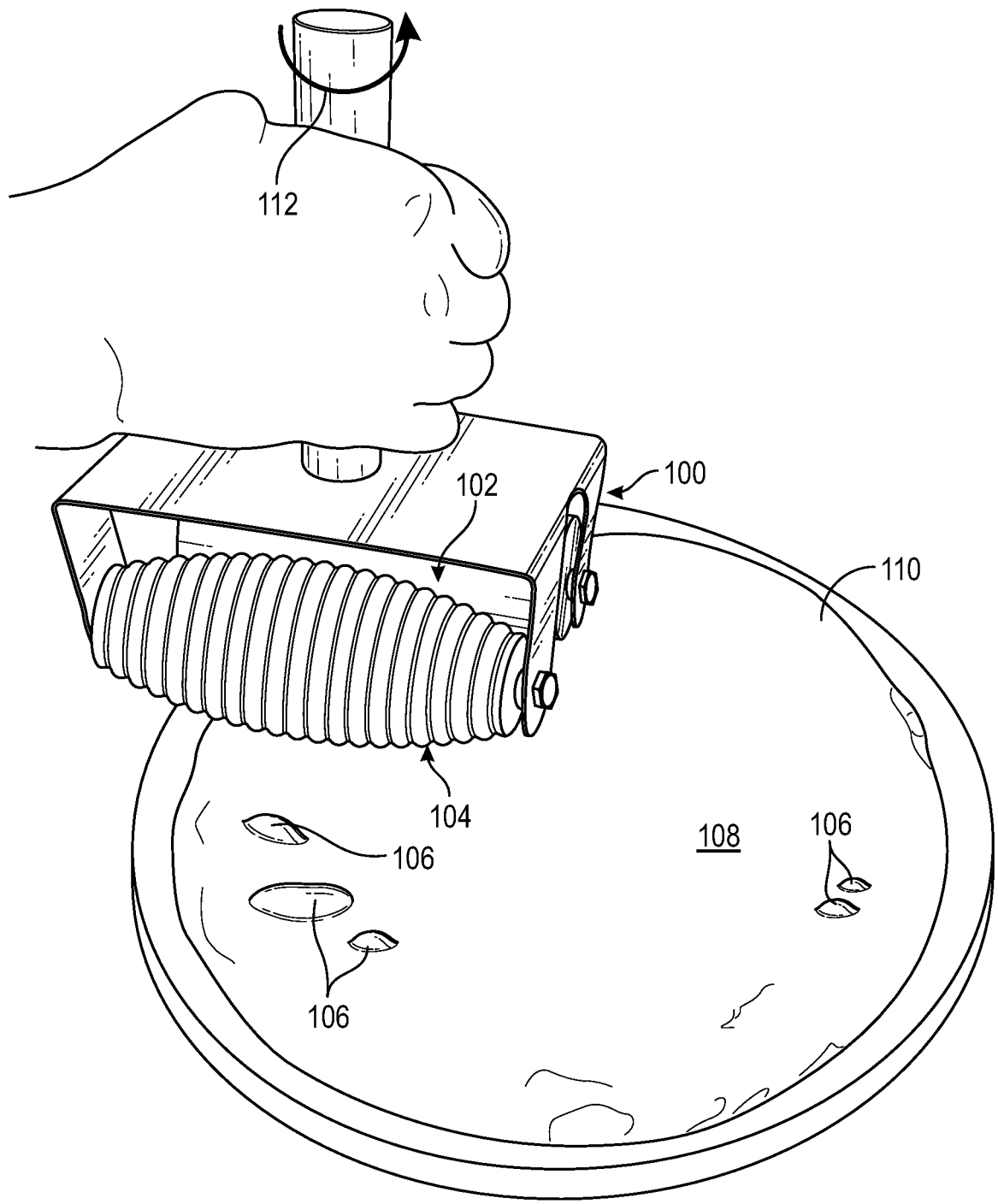
Figure 1D:
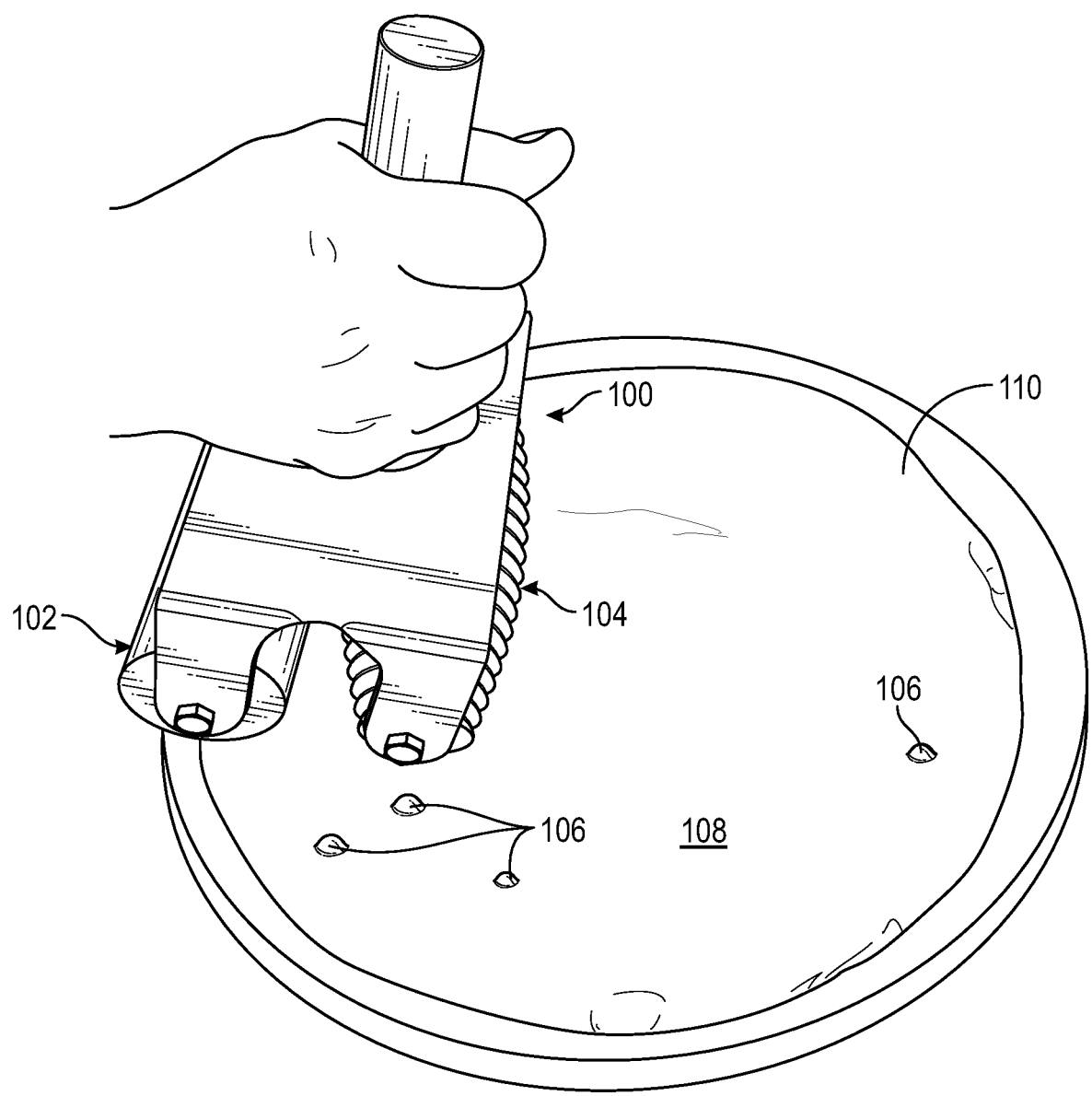
Figure 1E:
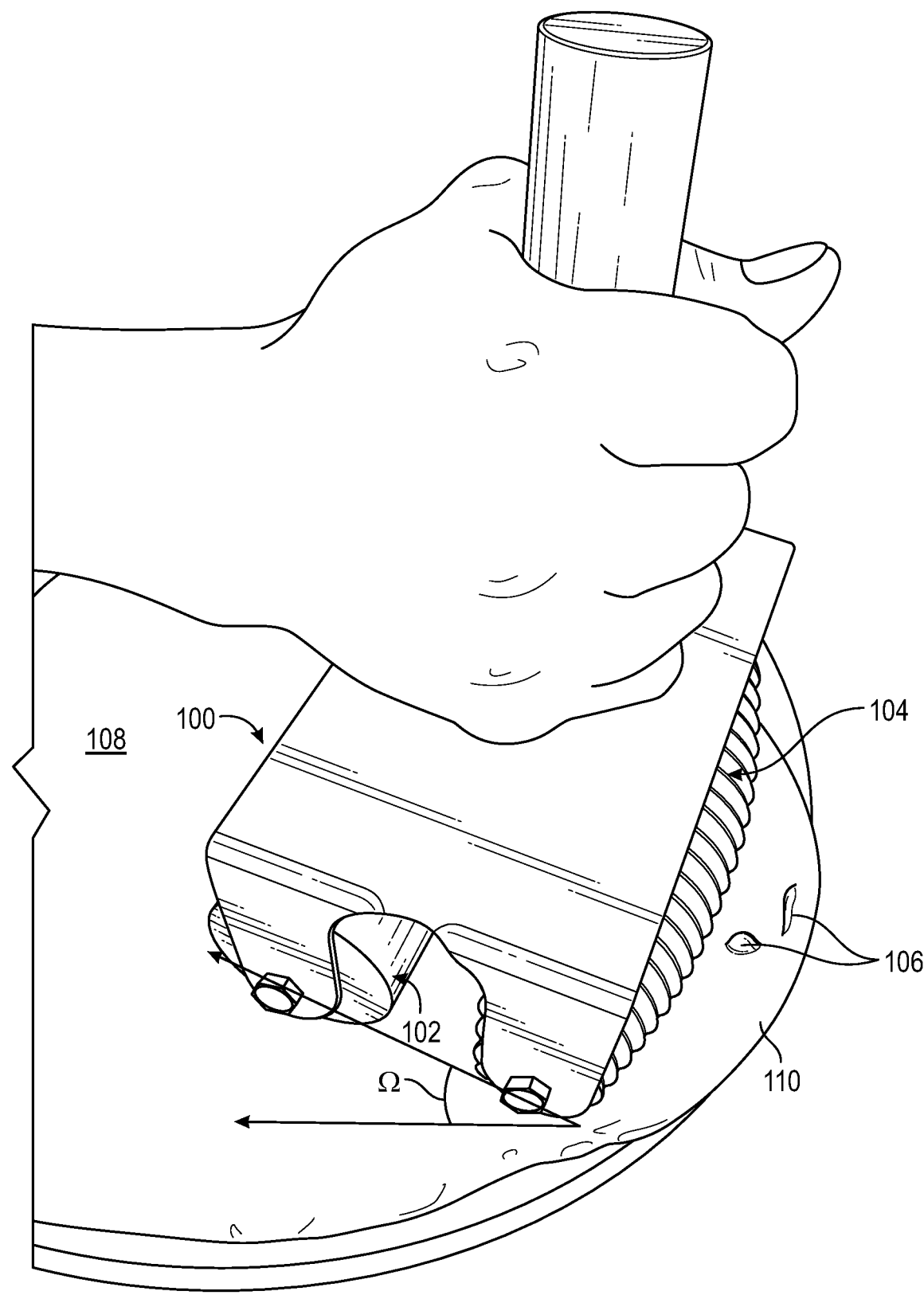
Figure 1F:
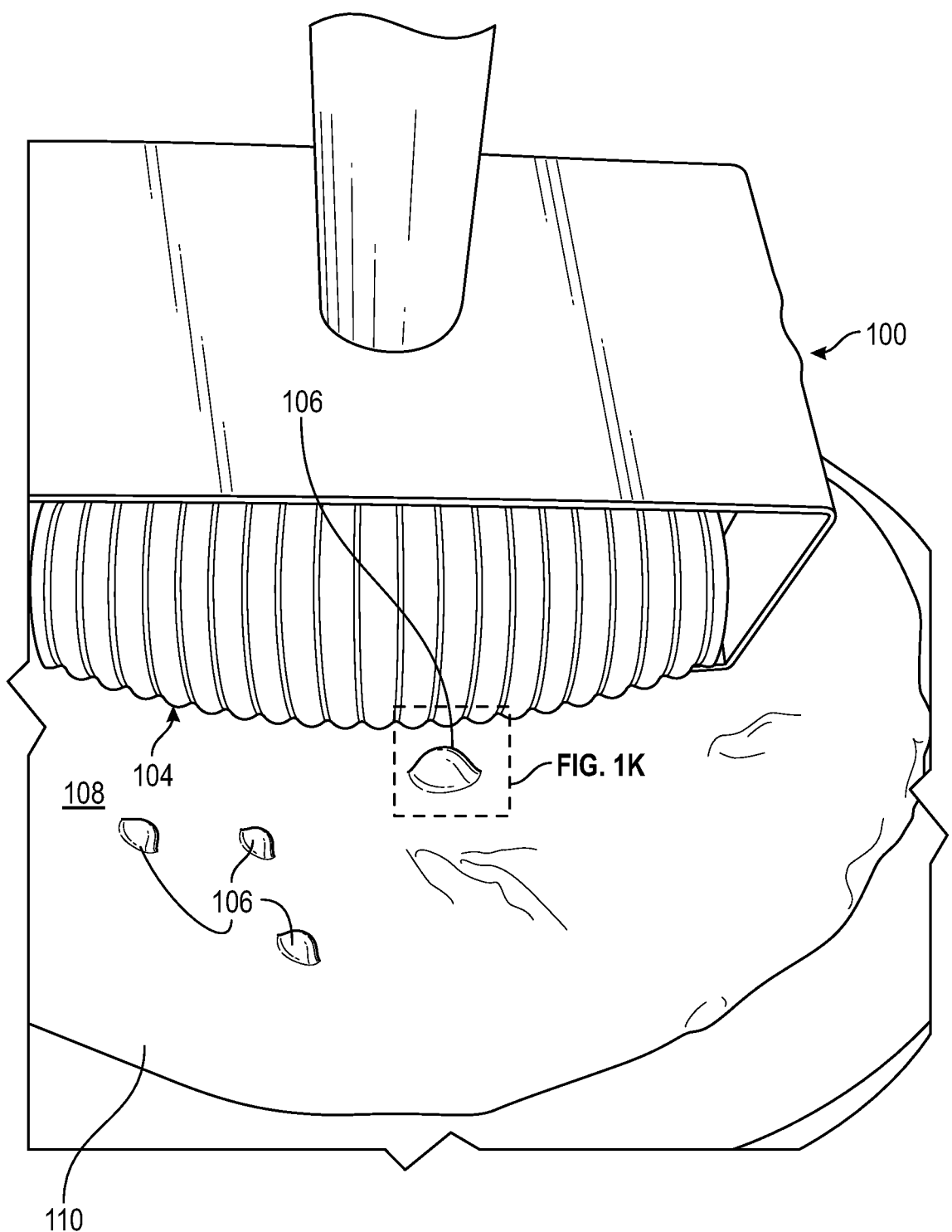
Figure 1G:
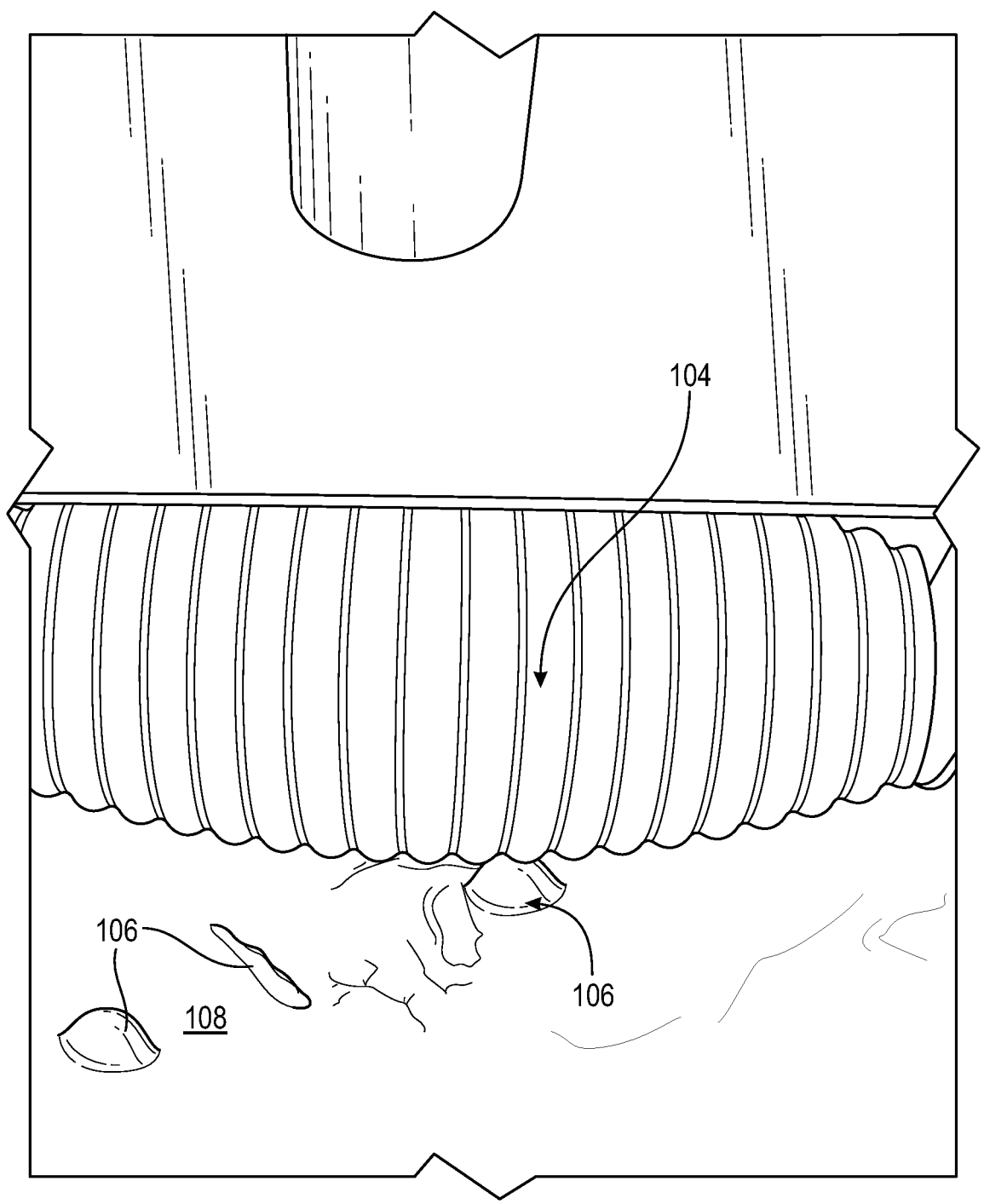

As progressively illustrated in FIGS. 1C and 1D, once dough 108 is spread-open to a desired size (e.g., thickness, diameter, etc.) by conventional first roller 102, culinary device 100 may be quickly rotated (as shown by arrows 112) to enable the use of the second, unique and novel roller 104 to remove trapped air bubbles 106 or displace them towards edge 110 (which will become light, flakey crust of the cooked/baked dough). FIGS. 1E to 1J progressively illustrate displacement of trapped air bubbles 106 towards edge 110, including tracks 174 imprinted on the rolled out dough due to outer surface configuration (detailed below) of second roller 104.

It should be noted that the overall, general configuration of roller 104 enables dough 108 to have a curved or rounded edge 110, at a higher elevation than the rest of the flat portion of dough 108. That is, roller 104 shape enables dough 108 to stretch and conform to a thicker (i.e., greater volume) rounded edge 110 as shown, which due to trapped air bubbles, bake into more volume, but light and flakey crust. It should be further noted that roller 104 may be used to prepare different diameter sized dough, including other shapes and configurations and should not be limited to only circular shape.

In this instance (best illustrated in FIG. 1E), second roller 104 may optionally be used by slightly tilting culinary device 100 at some selected angle Ω so to raise conventional, first roller 102, moving roller 102 away from contacting dough 108 while roller 104 works dough 108 to remove air bubbles 106 and create a flakey edge 110. Accordingly, users with no experience may professionally roll out dough 108 evenly with a single tool easily and rapidly, removing or displacing air bubbles 106, and creating edge 110 with trapped air bubbles 106 therein for generating a flakey crust.

FIGS. 2A to 2I are non-limiting, exemplary illustrations of the various views of the culinary device shown in FIGS. 1A to 1J in accordance with one or more embodiments of the present invention. As illustrated in FIGS. 1A to 2I, culinary device 100 is comprised of a support 118 that has abase-structure 114 and a handle 116. Culinary device 100 further includes a conventional first roller 102 and unique and novel second roller 104 associated with base-structure 114.

As illustrated, the conventional flat surface, cylindrical first roller 102 is positioned adjacent unique and novel second, roller 104, with longitudinal axis 176 (FIG. 2I) of roller 104 and a longitudinal axis 178 of conventional roller 102 being parallel.

Figure 3A:
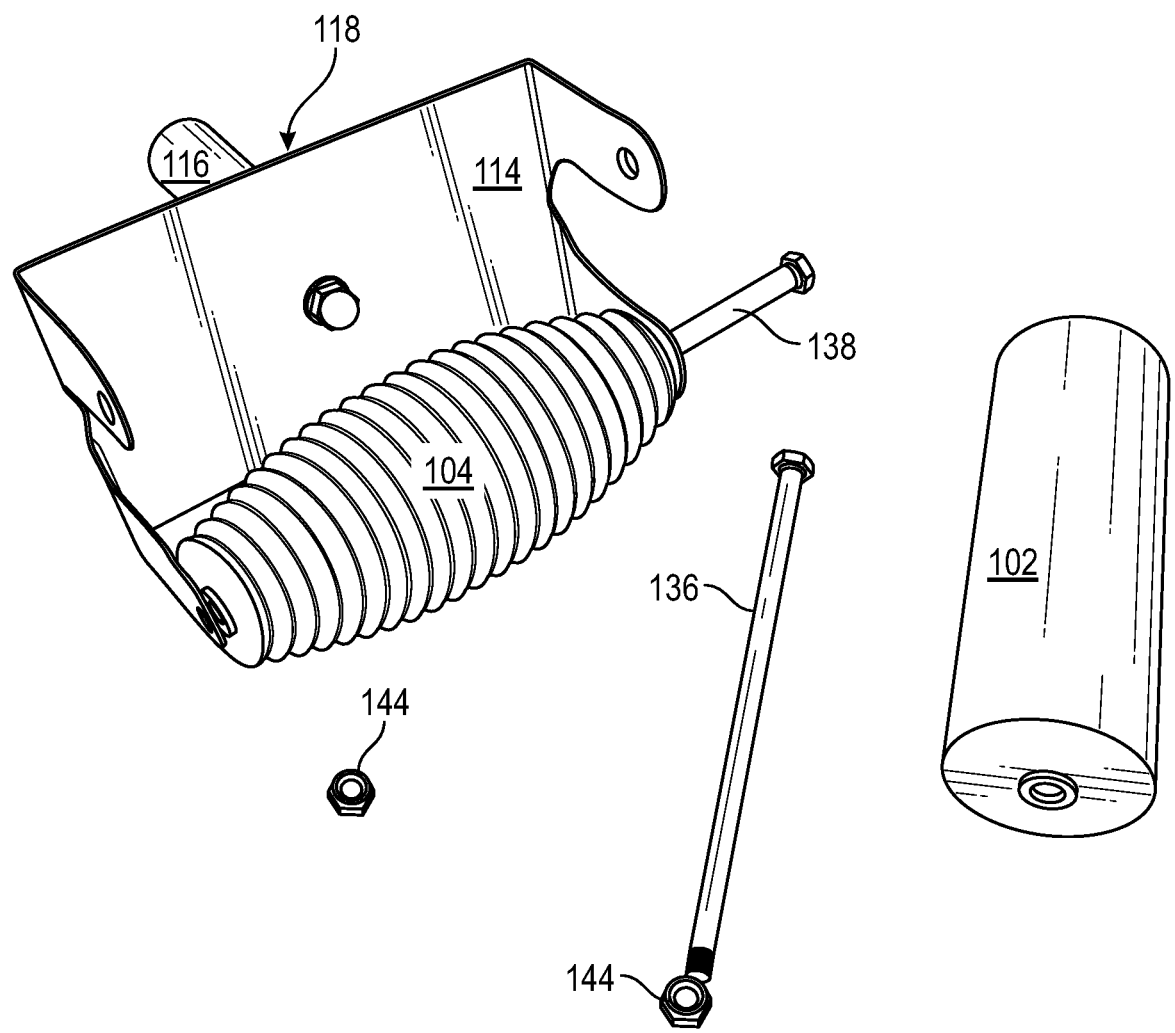
Figure 3B:
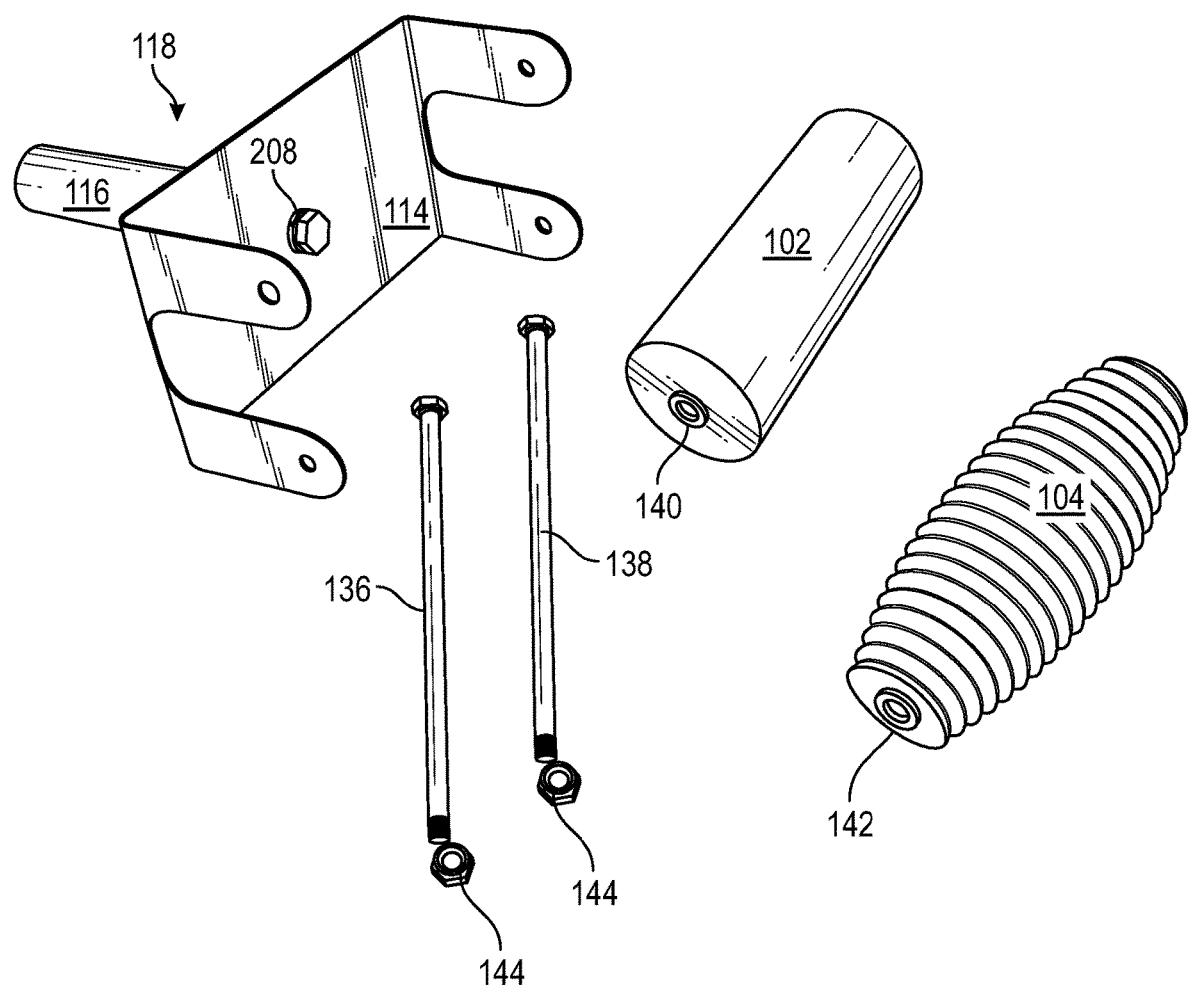
Figure 3C:
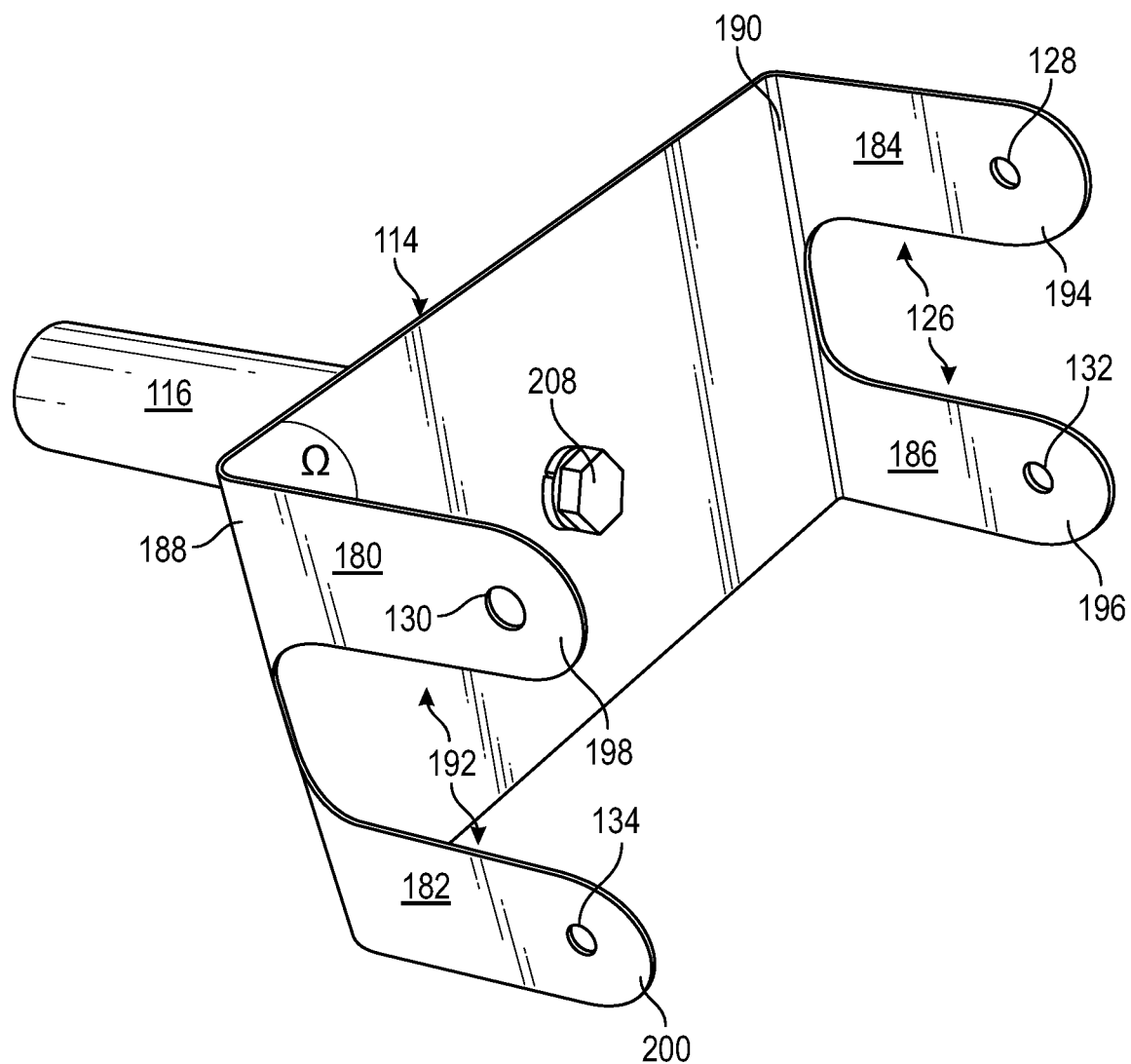
Figure 3D:
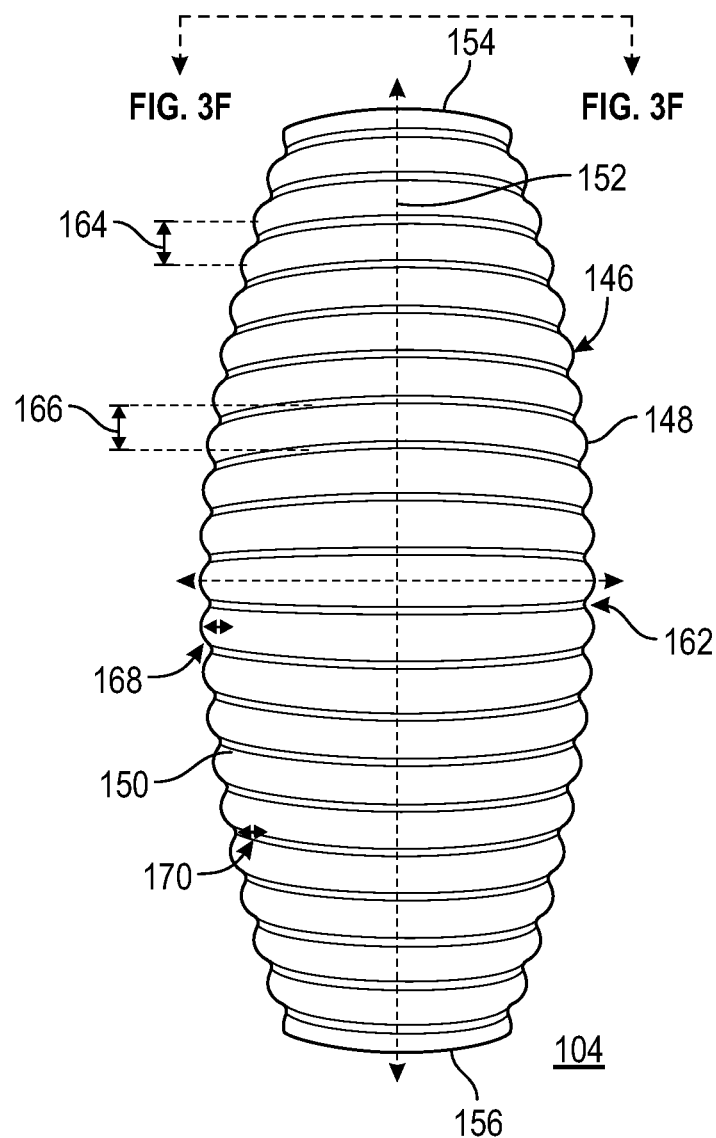
Figure 3E:
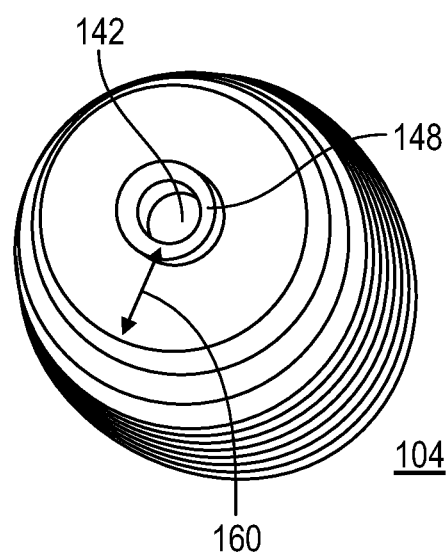

FIGS. 3A to 3F are non-limiting, exemplary illustrations of culinary device 100 illustrated in FIGS. 1A to 2I, detailing various components while progressively illustrating a non-limiting, exemplary, method of disassembly thereof in accordance with one or more embodiments of the present invention. FIG. 3C is a non-limiting, exemplary illustration of support 118 of culinary device 100 illustrated in FIGS. 1A to 3B without the rollers in accordance with one or more embodiments of the present invention. FIGS. 3D and 3E are non-limiting, exemplary illustrations of the various views of the unique and novel second roller 104 in accordance with one or more embodiments of the present invention, with FIG. 3F illustrating a cross-sectional view taken from FIG. 3G.

As illustrated in FIGS. 1A to 3F, base-structure 114 of support 118 includes a first laterally extending, straight flange 180, a second laterally extending straight flange 182, a third laterally extending straight, flange 184, and a fourth laterally extending straight flanges 186. Laterally extending linear flanges 180, 182, 184, 186 are bent at respective lateral edges 188 and 190 of base-structure 114 at a preferred angle of Ω (about 90°) to form dual yoke-like structures 126 and 192.

First laterally extending linear flange 180 has a first free distal end 198 that includes a first opening 130. Second laterally extending linear flange 182 has a second free distal end 200 that includes a second opening 134.

Third laterally extending linear flange 184 has a third free distal end 194 that includes a third opening 128. Fourth laterally extending linear flange 186 has a fourth free distal end 196 that includes a fourth opening 132.

As illustrated, first and third openings 130 and 128 are aligned through which a first axel 136 (e.g., elongated shoulder screws) may be passed to mount conventional first roller 102 to base-structure 114 of support 118. Second and fourth openings 134 and 132 are also aligned through which a second axel 138 (e.g., another elongated shoulder screws) may be passed to mount conventional second, novel roller 104 (detailed below) to base-structure 114 of support 118. The first and the second axels 136 and 138 are identical. In other words, dual yoke-like structures 126 and 192 include first and third openings 130/128 and second and fourth openings 134/132 through which first axel 136 and second axel 138 respectively enable mounting of conventional first roller 102 and novel second roller 104 to base-structure 114.

More specifically, first axel 136 may be inserted through first opening 130, axel bore 140 of conventional roller 102, and third opening 128 and fastened by a first nut 144. Additionally, second axel 138 may be inserted through second opening 134, axel bore 142 of novel roller 104, and fourth opening 132 and fastened by a second nut>144.

It should be noted that in this non-limiting, exemplary instance, all of laterally extending flanges 180, 182, 184 and 186, including openings 130, 134, 128, and 132, and further axels 136 and 138 may be identical. Accordingly, since yoke structures 126 and 192 may be identical, the position, placement or mounting of rollers 102 and 104 may be varied (switched). Further, in this non-limiting, exemplary instance, handle 116 is secured to base-structure by a fastener 208 in a conventional manner.

As detailed in relation to FIGS. 1A to 1J, dual roller device (i.e., culinary device 100) enables use of a single device where dough 108 may first be flattened or rolled out by flat roller 102 and by a mere flip of device 100, novel roller 104 may be used next to remove bubbles 106 or displace them towards edges 110 of dough 108 to generate crust, providing an even thickness dough 108.

As best illustrated in FIGS. 3D to 3F, second novel roller 104 has a generally elongated ellipsoid of revolution shape (also known as a prolate spheroid) having an outer corrugated surface 146 comprised of rounded, smooth, curved surface ridges 148 and furrows 150 that are transversely oriented along a major axis 152 of roller 104. Roller 104 may comprise of any well-known food grade or food safe material such as wood, plastic, steel, etc.

Transversely oriented lateral ends 154 and 156 of major axis 152 of second roller 104 are identical and are generally flat, and include lateral openings 158 of longitudinally oriented axel bore 142, which extends along major axis 152 of second roller 104.

Second roller 104 includes a constant inner diameter 202 (FIG. 3F) that defines lateral openings 158 of bore 142, and an outer diameter 160 that defines the thickness of second roller 104. As illustrated, outer diameter 160 progressively increases from lateral ends 154/156 to a generally middle portion 162.

Non-limiting, non-exhaustive listing of examples of various dimensions of roller 104 are illustrated in FIG. 3F (all in inches), which may include for example, from apex to apex of a ridge 148 to an adjacent ridge 148 a distance 164 (FIG. 3D) of about 0.25 inches, with bottom to bottom of furrow 150 to an adjacent furrow 150 a distance 166 being the same (about 0.25 inches).

As further illustrated, in this non-limiting, exemplary illustration for example, furrows 150 of roller 104 may have a radius 210 of about 0.05 inches, with ridges 148 having a radius 212 of about 0.13 inches. Roller 104 may have an upper tangent 214 of radius 214 of 7.00 inches and a lower tangent 218 of radius 220 of about 6.95 inches. The total linear length 222 of roller 104 may span about 5.12 inches, and its width 224 measured at mid-section 162 as shown may have a distance of about 2.20 inches. Diameter 226 at lateral ends 154/156 of roller 104 may be about 1.23 inches and bore 142 may have a diameter 202 of about 0.26 inches. It should be noted that any and all measurements illustrated in the drawings or described are non-limiting examples and are for purposes of discussion only. Accordingly, the values provided may easily be changed for different sized rollers and hence, the exemplary illustrated values should not be limiting.

It should be noted that the number of ridges 148 and furrow 150 may be varied for a given size roller 104. However, assuming a fixed sized roller 104, increasing the numbers of ridges 148 (and hence, reducing their separation distance 164), would make corrugated surface 146 of roller 104 more flat and behave like or mimic a non-corrugated surface roller. On the other hand, reducing the numbers of ridges 148 (and hence, increasing the separation distance 164), would increase corrugation to a point where dough will roll out (spread-open) unevenly. That is, dough 108 underneath ridges 148 would experience greater force or pressure while dough portions underneath furrows 150 would remain almost untouched.

Figure 1H:
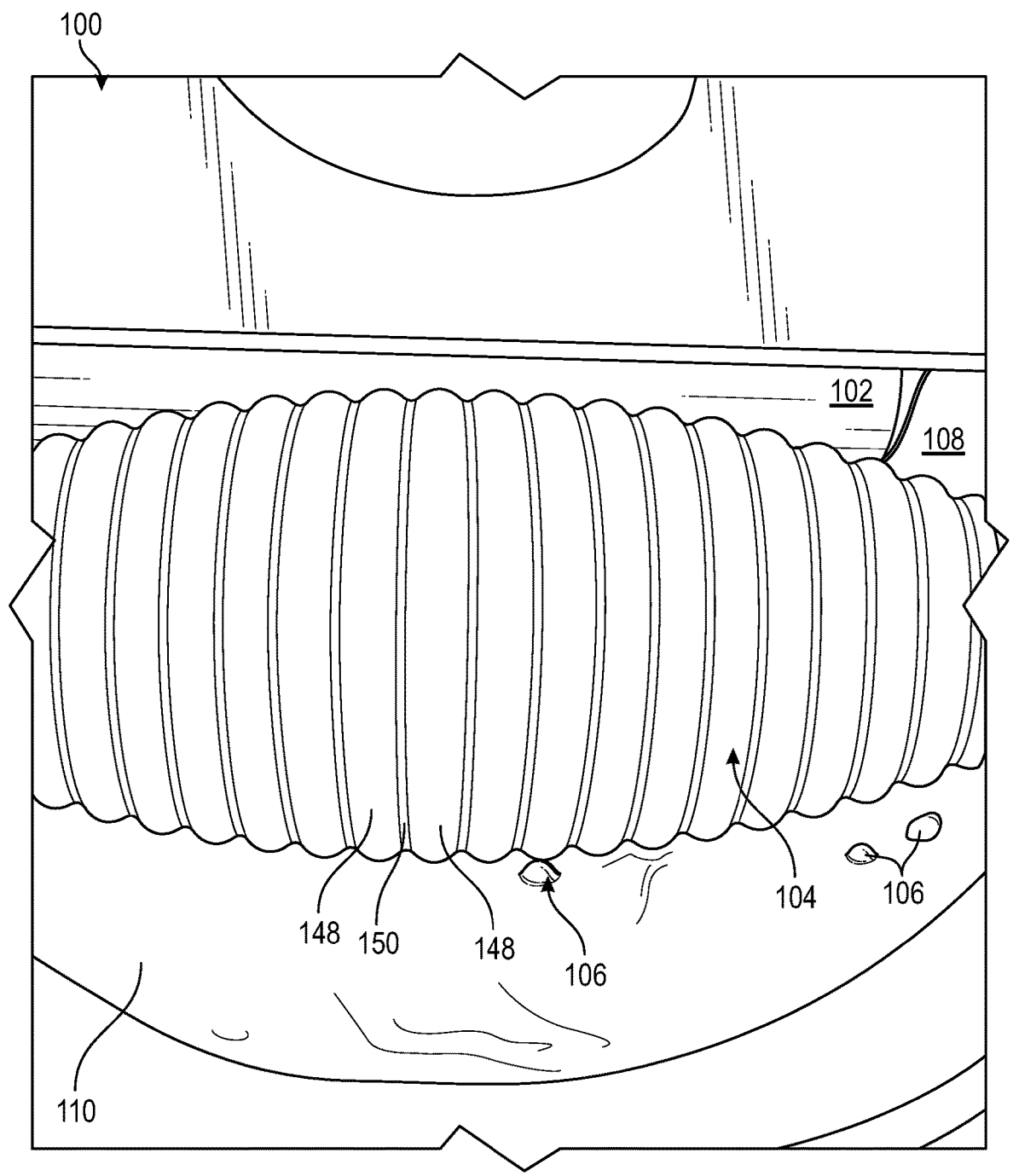
Figure 1I:
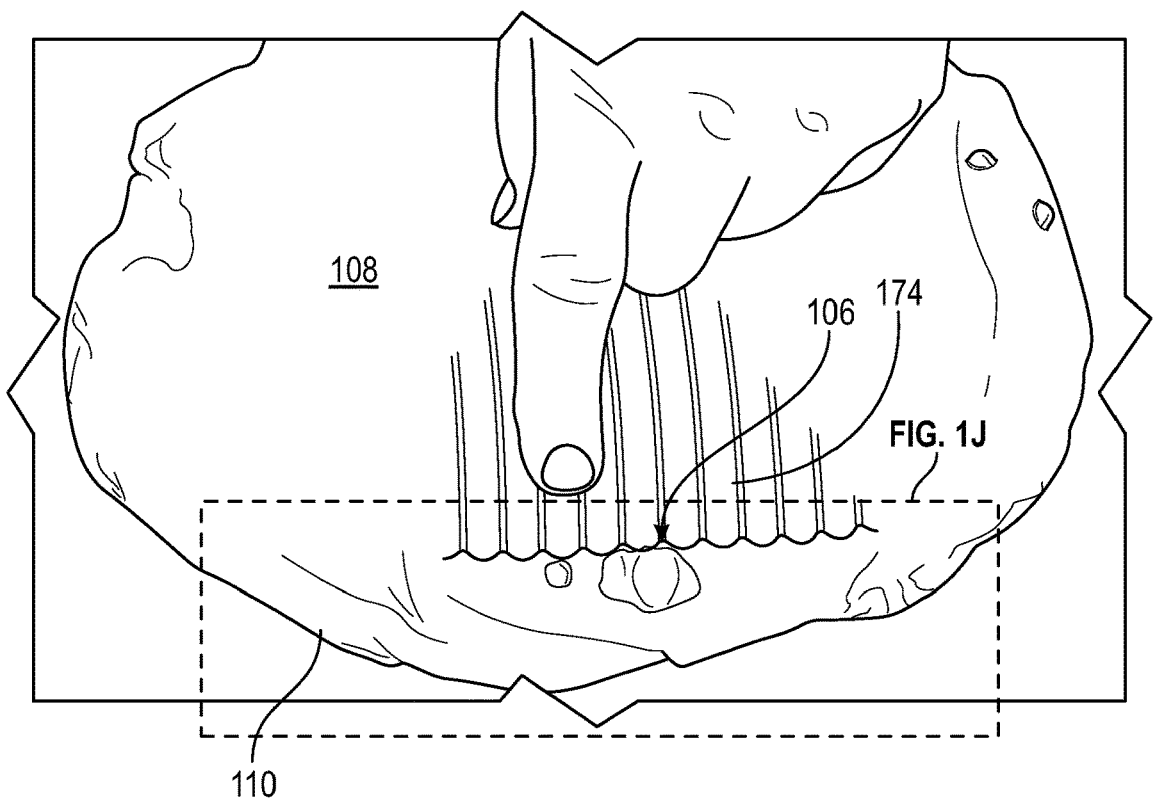
Figure 1J:
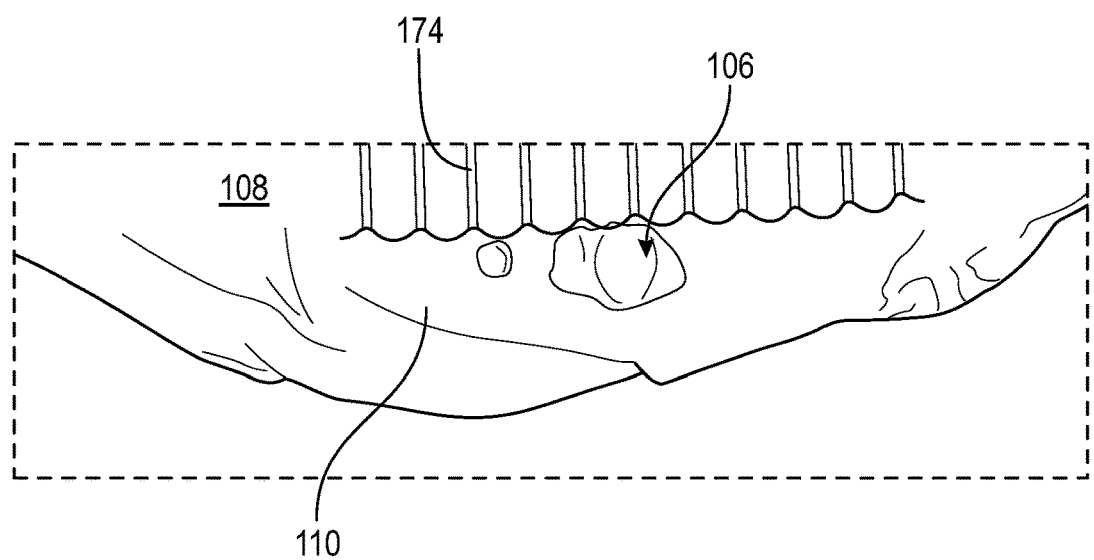
Figure 2A:
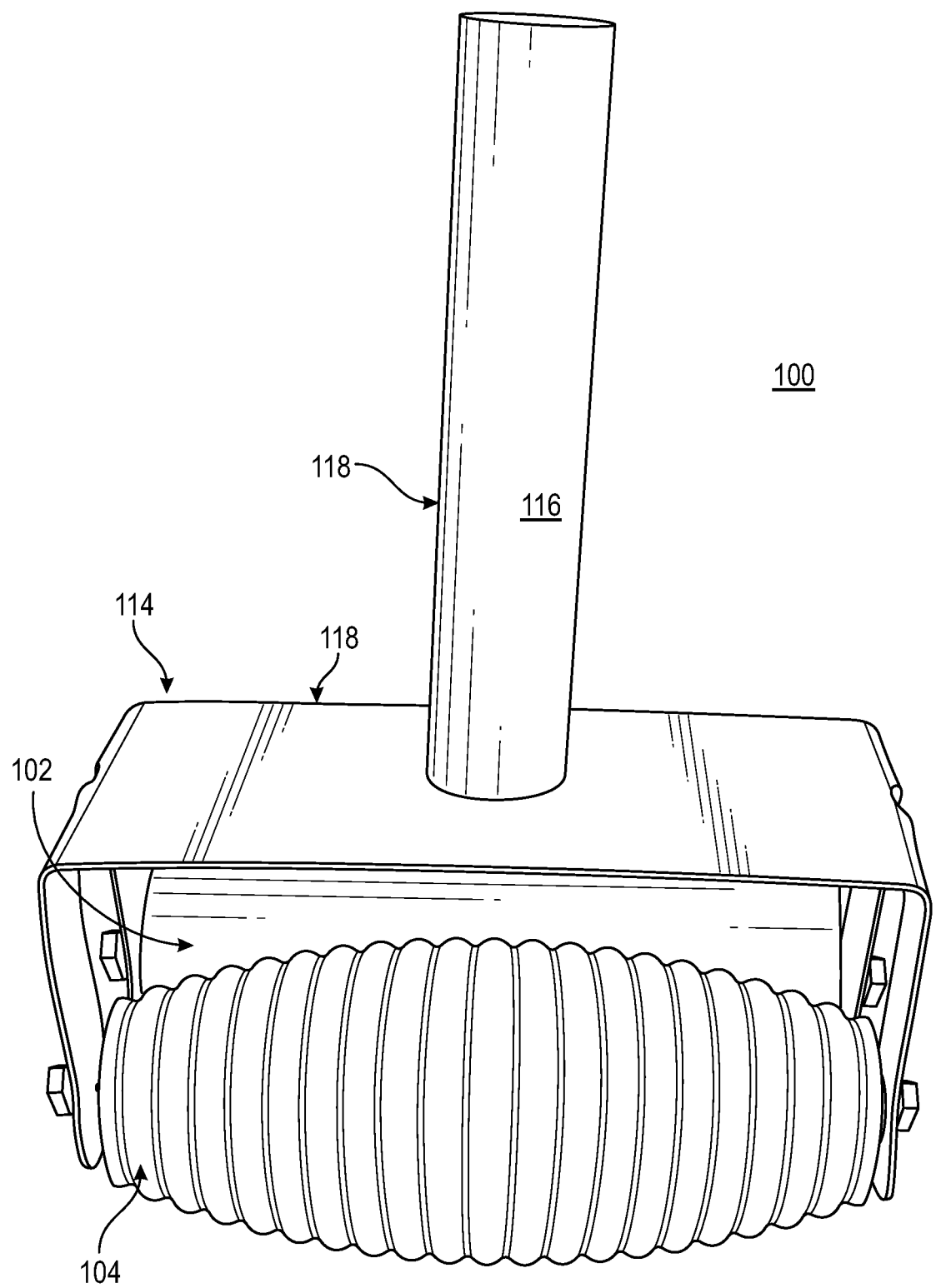
FIGS. 2A to 2I are non-limiting, exemplary illustrations of the various views of the culinary device shown in FIGS. 1A to 1J in accordance with one or more embodiments of the present invention.
Figure 2B:
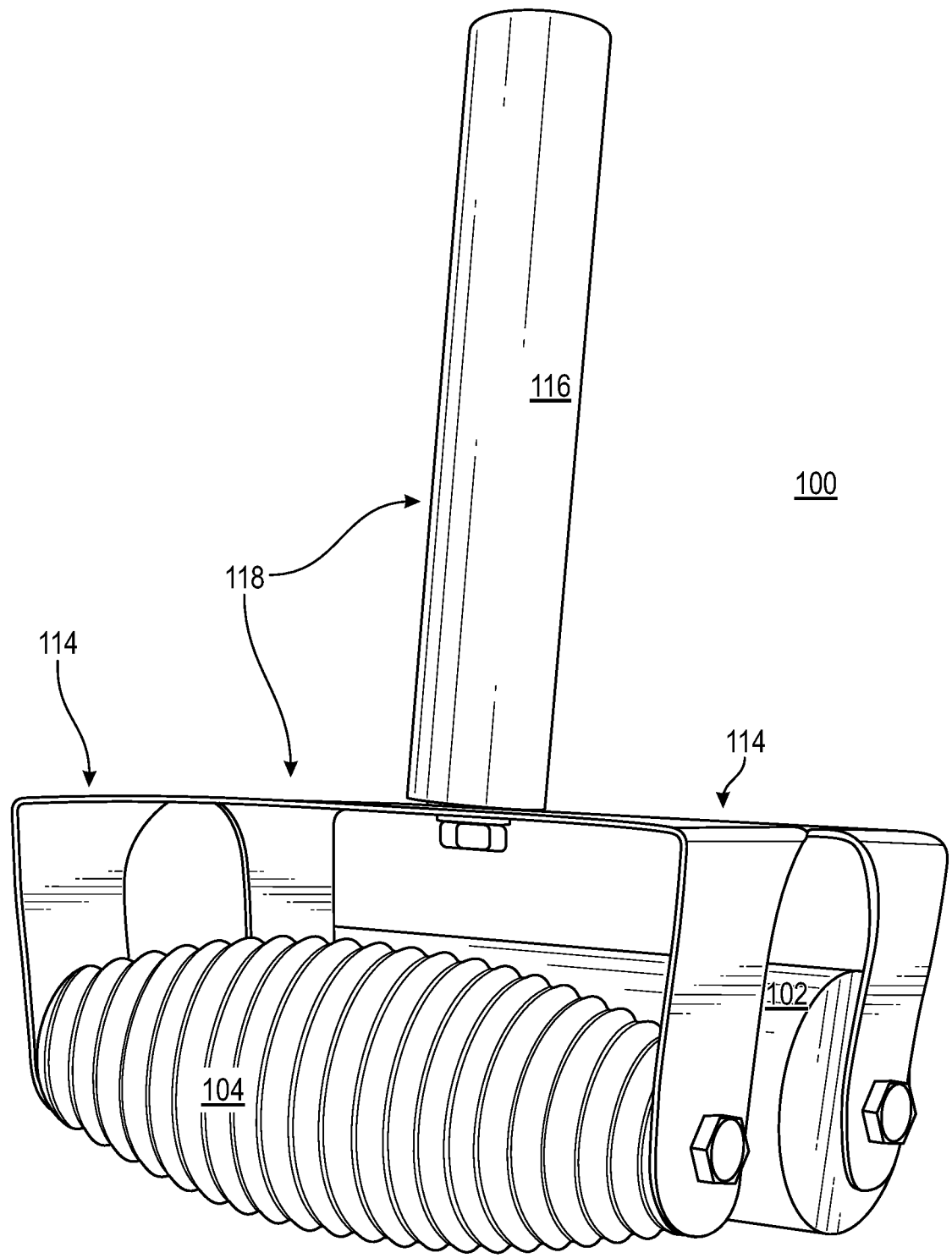
Figure 2C:
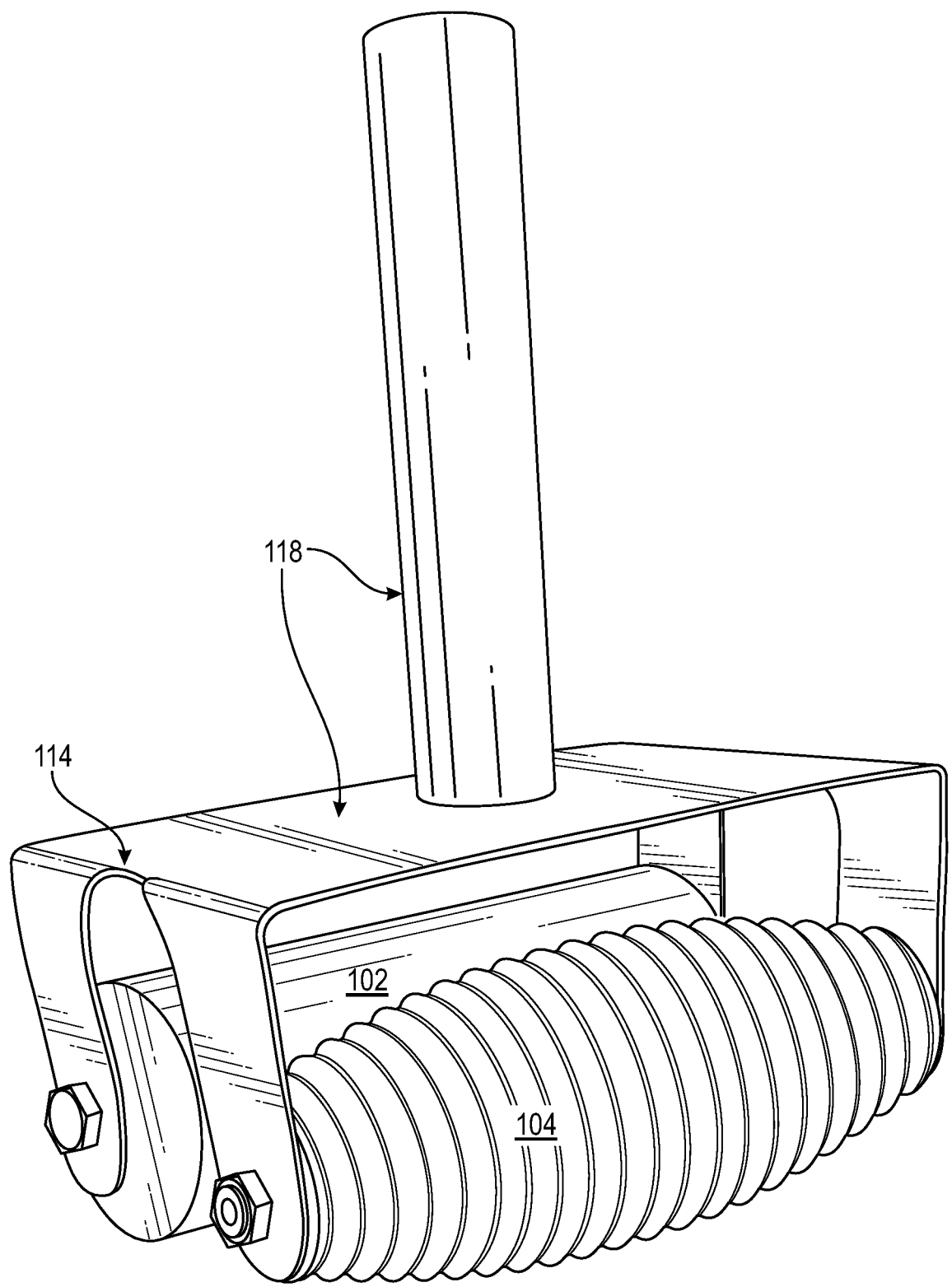
Figure 2D:
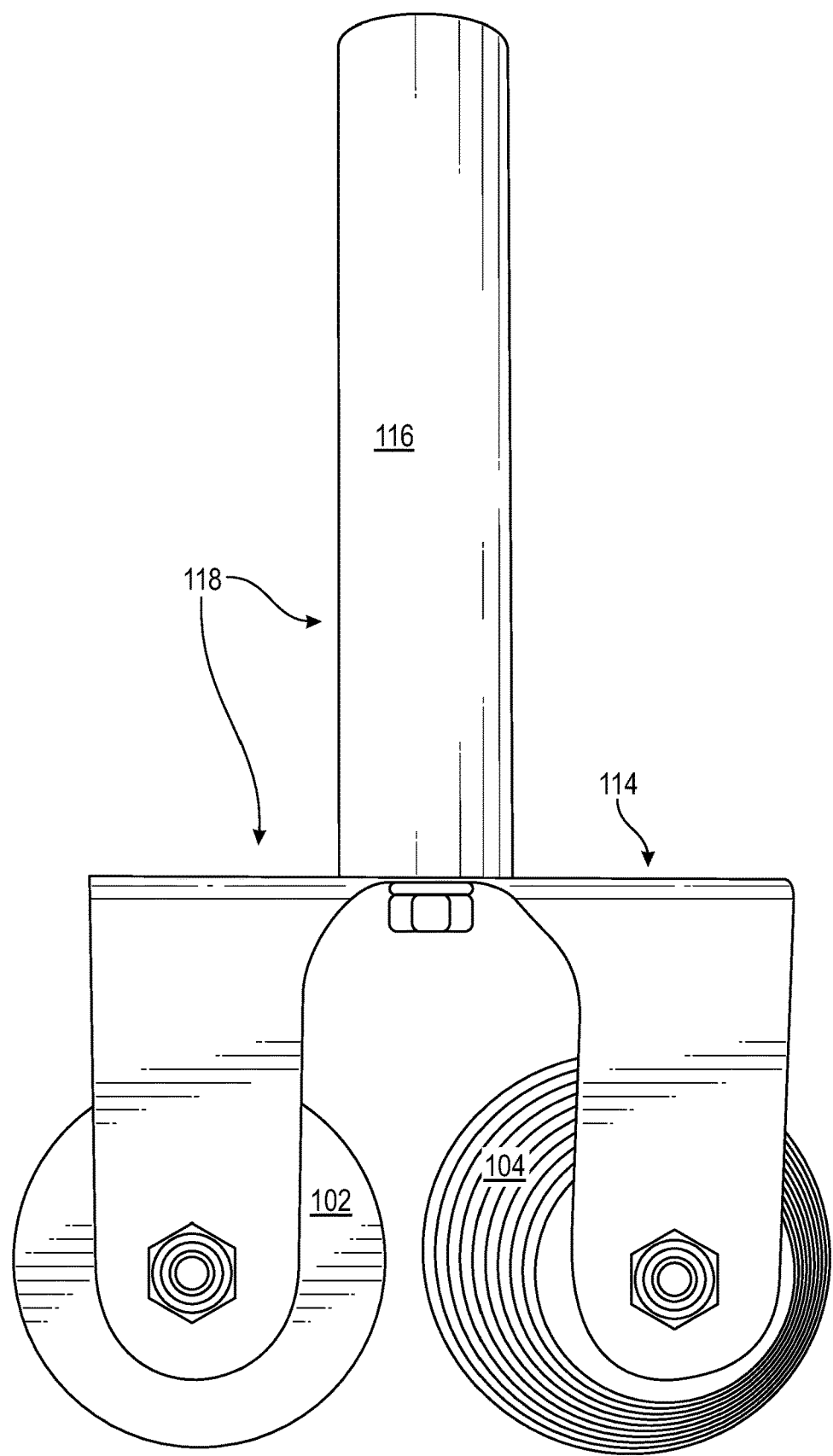
Figure 2E:
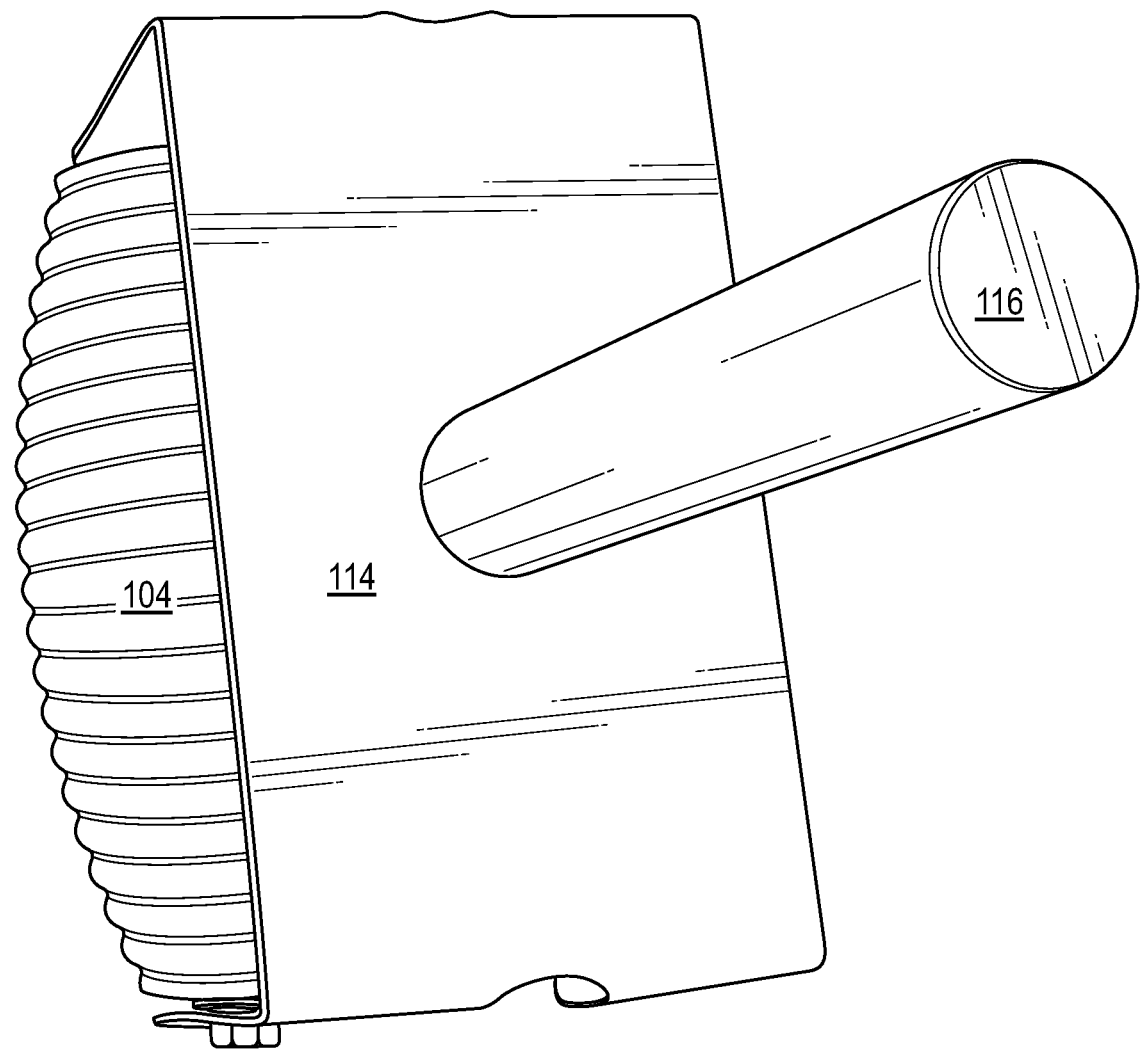
Figure 2F:
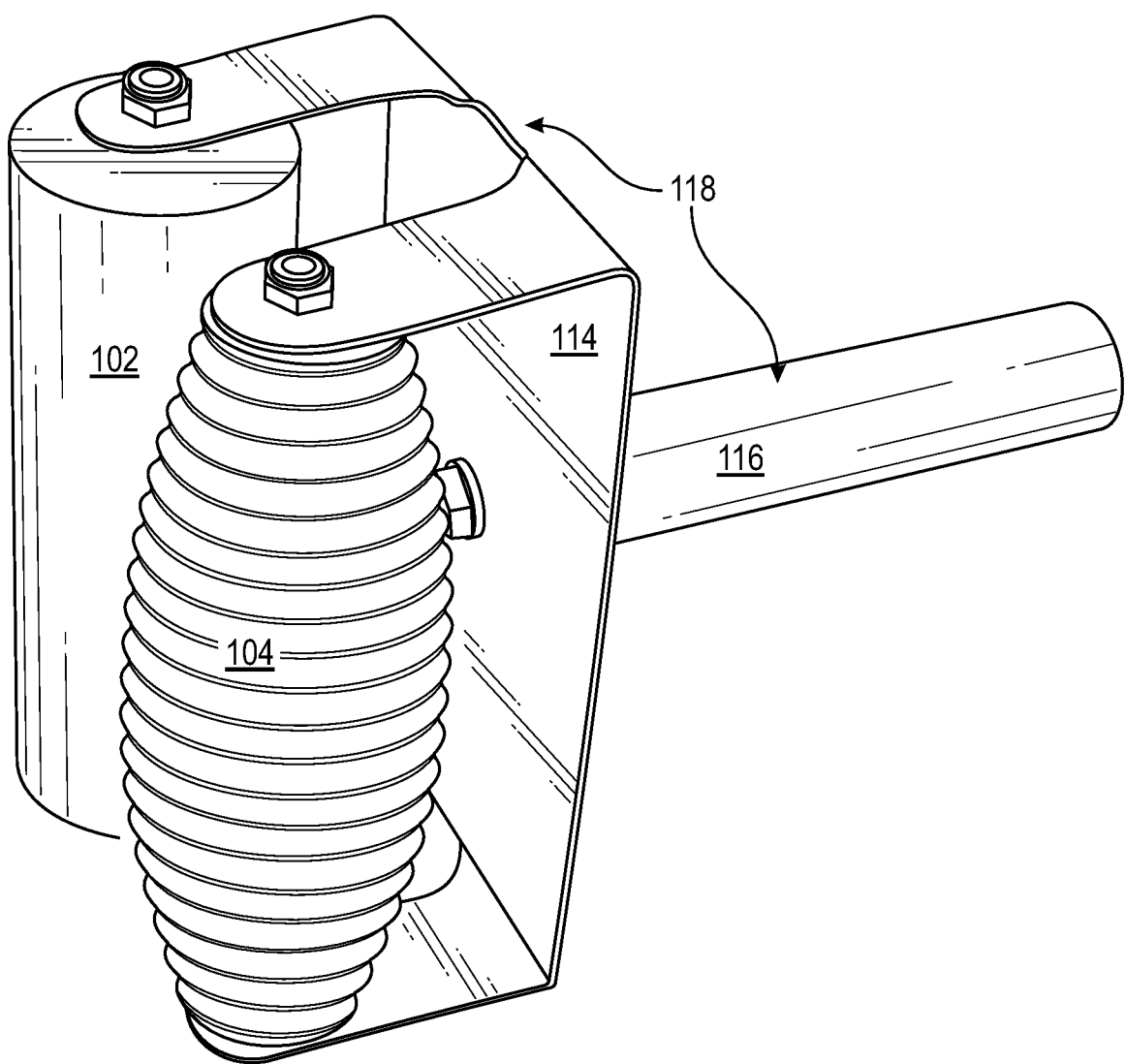
Figure 2G:
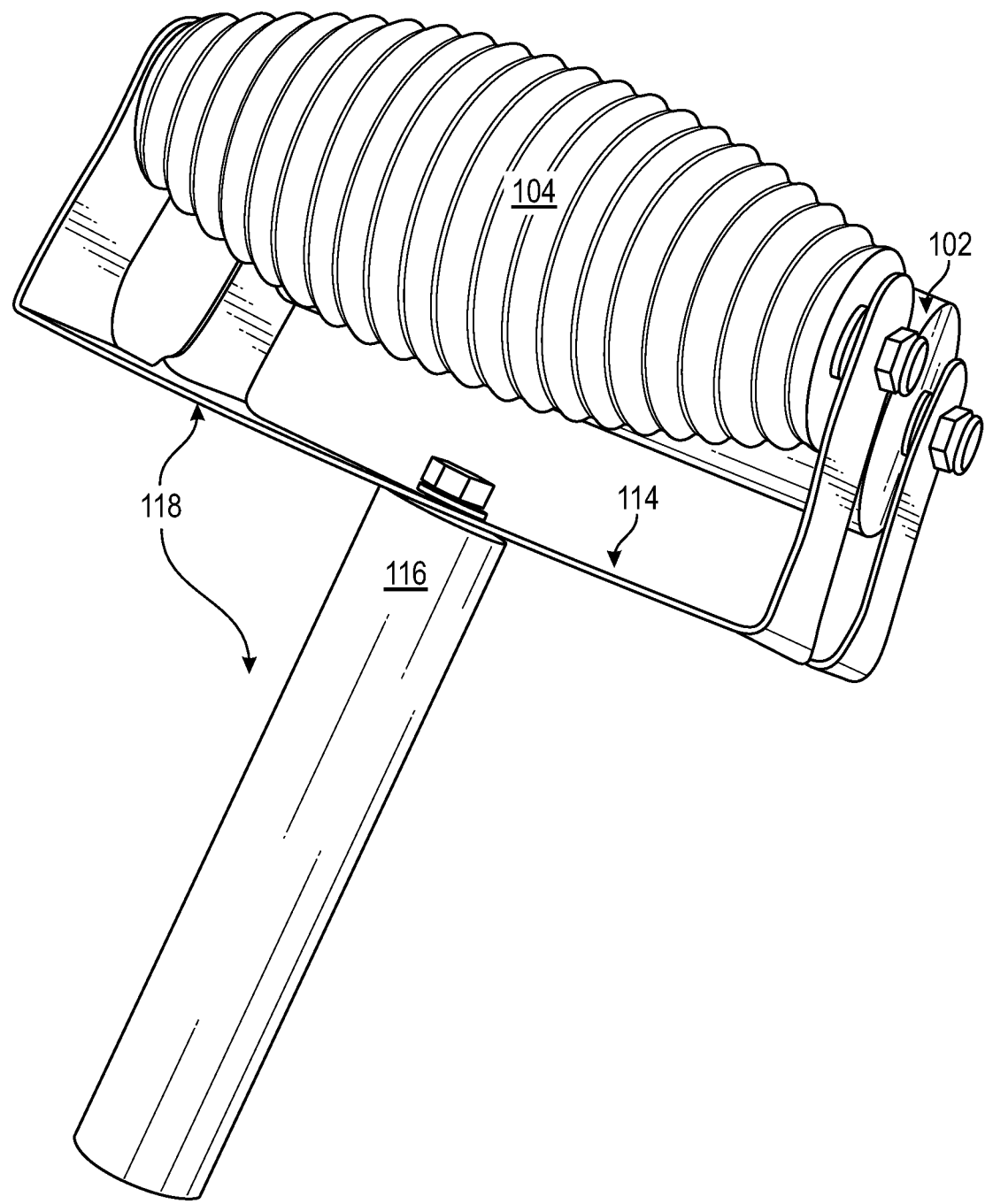
Figure 2H:
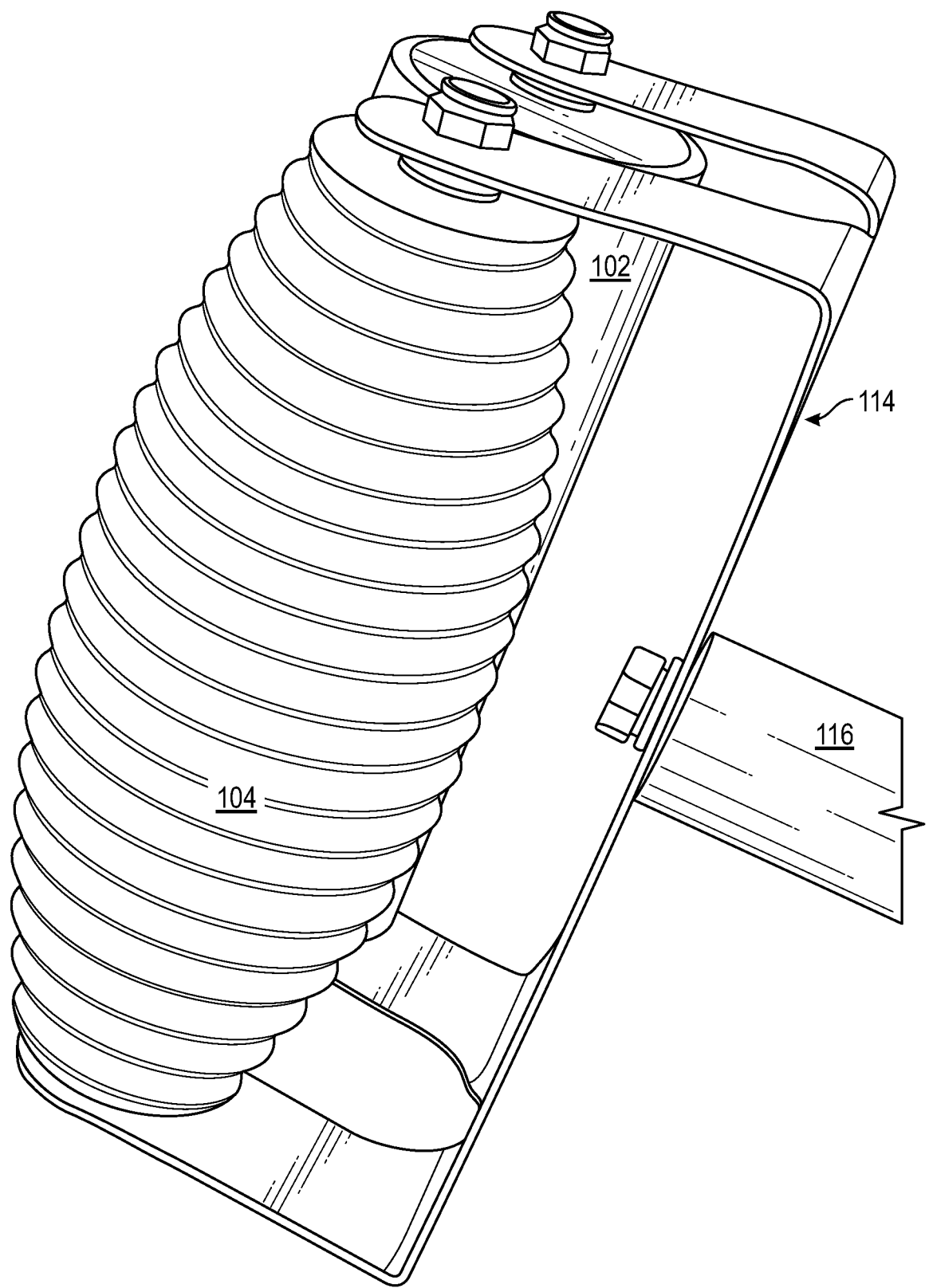
Figure 2I:
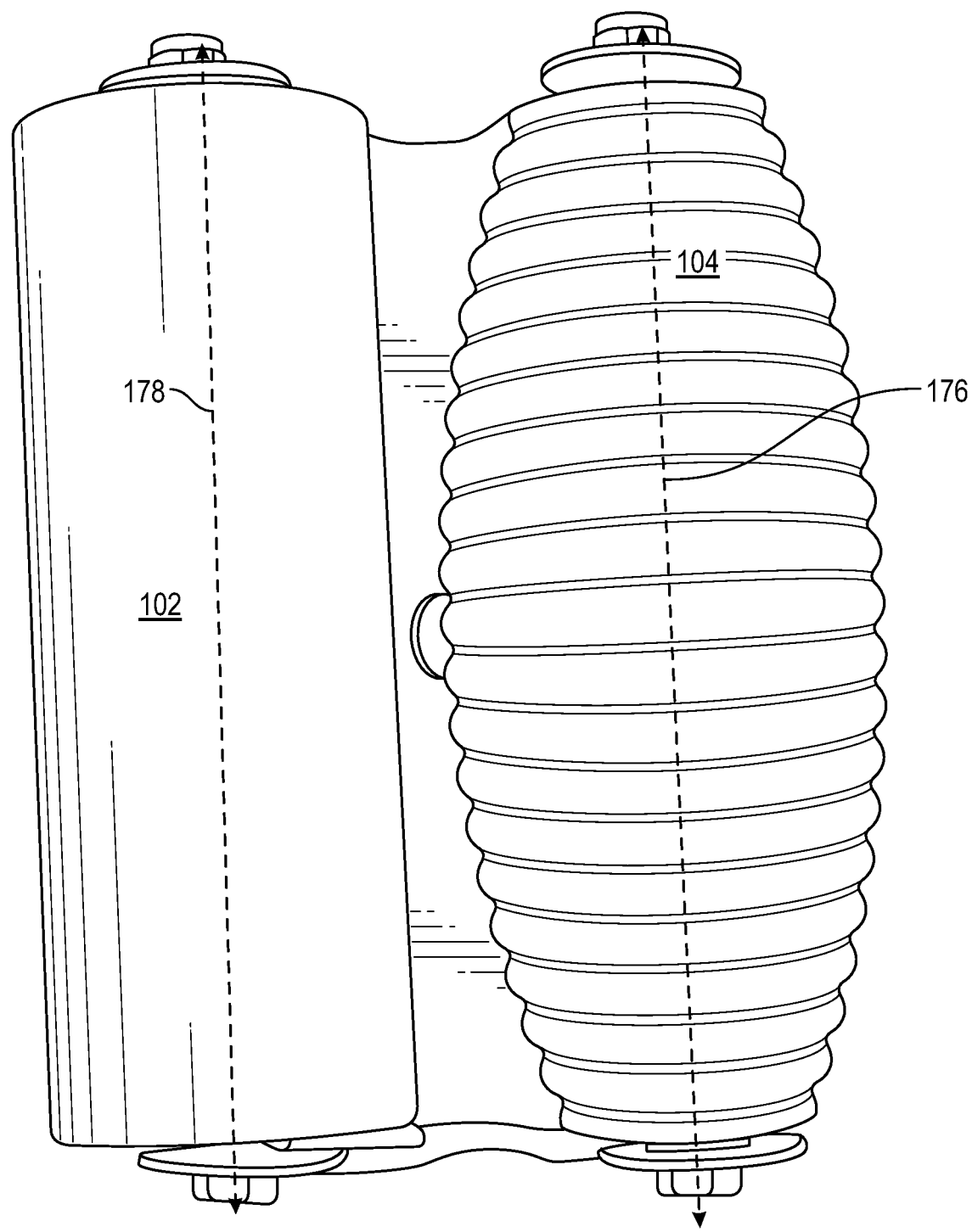

Referring back to FIGS. 1A to 1J, assuming some air bubbles 106 are not burst, the surviving bubbles 106 are guided and moved (displaced) by ridges 148 and trapped underneath furrow 150 (best shown in FIG. 1H) as, roller 104 is moved in radial direction from the center of dough 108 to edges 110 thereof, continuously applying pressure on dough 108 where bubbles 106 (not burst) are displaced towards edge 110. Furrow 150 form reliefs (or escapes) for some of bubbles 106 without them being burst while surrounded and guided by ridges 148. The combination of ridges 148 and furrows 150 burst most of bubbles 106 and as illustrated in FIG. 1H, move (or displace) other towards edges 110 of dough 108 without being burst, forming a desirable flakey crust, when cooked.

Additionally, the combination of ridges 148 and furrows 150 do not completely further flatten dough 108 to a point where the sections of dough 108 further worked to remove bubbles 106 become too thin compared with other parts of dough 108. This is due in great part to furrows 150 of roller 104, forming reliefs (in the form of tracks 174) for dough portions underneath furrows 150 where dough 108 is not compressed as much as compared to the dough portions underneath ridges 180 of roller 104. Accordingly, the combinations of the compressed and uncompressed positions of dough 108 (as evident from tracks 174) provide an even overall dough thickness, providing a generally uniform thickness distribution. It should be noted that tracks 174 may easily be cleared by lightly rolling over them with flat roller 102 (if necessary). Accordingly, with the present invention, bubbles 106 are moved or displaced away from the general flattened portions to edges 110 while maintaining a generally evenly thick rolled out dough, but with edges 110 having a higher volume to create a flakey crust.

Figure 4:
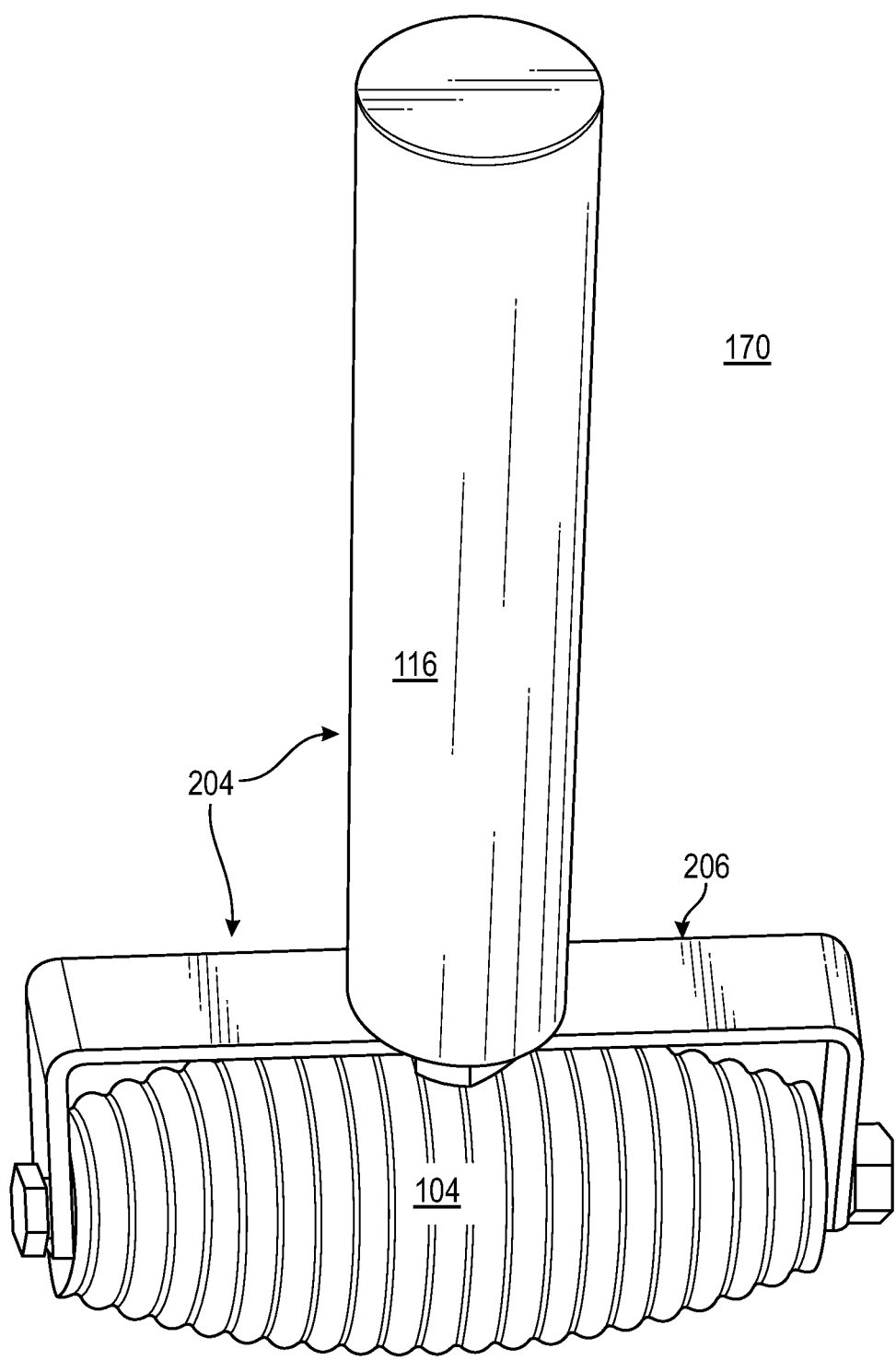
FIG. 4 is non-limiting, exemplary illustrations of a culinary device in accordance with another embodiment of the present invention where only a single second roller is used.

FIG. 4 is non-limiting, exemplary illustrations of a culinary device, in accordance with another embodiment of the present invention where only a single second roller is used. Culinary device 170 illustrated in FIG. 4 includes similar corresponding or equivalent components, interconnections, functional, operational, and or cooperative relationships as culinary device 100 that is shown in FIGS. 1A to 3F, and described above. Therefore, for the sake of brevity, clarity, convenience, and to avoid duplication, the general description of FIG. 4 will not repeat every corresponding or equivalent component, interconnections, functional, operational, and or cooperative relationships that has already been described above in relation to culinary device 100 that is shown in FIGS. 1A to 3F but instead, are incorporated by reference herein.

As illustrated in FIG. 4, culinary device 170 is comprised of a well-known, conventional support 204 that has a well-known base-structure 206 and a well-known handle 116. In this non-limiting, exemplary embodiment, base-structure 206 of support 204 accommodates a single roller 104, which may be used in the same manner as described above.

Mounting and securing of roller 104 onto support 204 is done in the same manner as mounting and securing most conventional rollers 102. In this non-limiting, exemplary instance, base-structure 206 itself is a well-known a single yoke associated with handle 116. The well-known single yoke base-structure 206 includes openings through which an axel (an elongated shoulder screw) connects roller 104 to support 204, with the axel inserted through a first opening of the yoke, axel bore 142 of roller 204, and a second opening of the yoke, and secured to the support 204 with a fastener (a nut).

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit, and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A culinary device, comprising:
a roller of elongated ellipsoid of revolution shape having an outer corrugated surface comprised of rounded, smooth, curved surface ridges and furrows that are transversely oriented along a major axis of the roller, wherein:
the roller is associated with a support, wherein:
the support includes:
a dual yoke structure associated with a handle through a base-structure;
a first yoke and a second yoke of the dual yoke structure include:
first openings and second openings through which a first and a second axel respectively connect the roller and a flat surface, cylindrical roller to the support, with the first axel and the second axel inserted through the first openings of the first and the second yoke, respective axel bores extended along the major axis of the roller and a longitudinal axis of the cylindrical roller with a flat outer surface, and through the respective second openings of the first and the second yoke, and secured to the support with fasteners;
with the cylindrical roller with the flat outer surface positioned adjacent and parallel to the roller.

2. The culinary device as set forth in claim 1, wherein:
transversally oriented lateral ends of the major axis of the roller are flat, and include lateral openings of a longitudinally oriented axel bore, which extends along the major axis of the roller.

3. The culinary device as set forth in claim 2, wherein:
the roller includes an inner diameter that defines the lateral openings of the bore, and an outer diameter.

4. The culinary device as set forth in claim 3, wherein:
the outer diameter progressively increases from a lateral end of the roller to a middle portion.

5. A culinary device, comprising:
a roller of prolate spheroid configuration having an outer corrugated surface that includes rounded, smooth, curved surface ridges and furrows that are transversely oriented along a longitudinal axis of the roller, wherein:
the roller is associated with a support, wherein:
the support includes:
a dual yoke structure associated with a handle through a base-structure;
a first yoke and a second yoke of the dual yoke structure include:
a first set of openings and a second set of openings through which a first and a second axel respectively connect the roller and a flat surface, cylindrical roller to the support, with the first axel and the second axel inserted through the first openings of the first and the second yoke, respective axel bores extended along the major axis of the roller and a longitudinal axis of the cylindrical roller with a flat outer surface, and through the respective second openings of the first and the second yoke, and secured to the support with fasteners;
with the cylindrical roller with the flat outer surface positioned adjacent and parallel to the roller.

6. The culinary device as set forth in claim 5, wherein:
transversally oriented lateral ends of the longitudinal axis of the roller are generally flat, and include lateral openings of the axel bore oriented and extended along the longitudinal axis of the roller.

7. The culinary device as set forth in claim 6, wherein:
the roller includes an inner diameter that defines the lateral openings of the bore, and an outer diameter.

8. The culinary device as set forth in claim 7, wherein:
the outer diameter progressively increases from a lateral end of the roller to a middle portion.

9. The culinary device as set forth in claim 5, wherein:
sizes of the ridges are uniform; and
sizes of the furrows are uniform.

10. The culinary device as set forth in claim 5, wherein:
the base-structure includes a first set of laterally extending flanges, and a second set of laterally extending flanges; and
the first and second sets of laterally extending flanges are bent at respective lateral edges of the base-structure at an angle in pairs to form the dual yoke structure.

11. The culinary device as set forth in claim 10, wherein:
first and second free distal ends of the first set of laterally extending flanges include the first set of openings; and first and second free distal ends of the second set of laterally extending flanges include the second set of openings.

\* \* \* \* \*